US012619845B2

(12) United States Patent
Sano et al.

(10) Patent No.: US 12,619,845 B2
(45) Date of Patent: May 5, 2026

(54) WIRELESS COMMUNICATION DEVICE

(71) Applicant: BROTHER KOGYO KABUSHIKI KAISHA, Nagoya (JP)

(72) Inventors: Ryosuke Sano, Nagoya (JP); Atsushi Fujioka, Nagoya (JP); Hirokazu Miyabayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/757,191

(22) Filed: Jun. 27, 2024

(65) Prior Publication Data

US 2025/0005309 A1      Jan. 2, 2025

(30) Foreign Application Priority Data

Jun. 29, 2023    (JP) ................................. 2023-106723

(51) Int. Cl.
*G06K 7/10*          (2006.01)
*G06K 15/02*        (2006.01)
*G06K 19/077*      (2006.01)

(52) U.S. Cl.
CPC ..... *G06K 7/10861* (2013.01); *G06K 7/10455* (2013.01); *G06K 15/024* (2013.01); *G06K 15/027* (2013.01); *G06K 19/07773* (2013.01)

(58) Field of Classification Search
CPC ........... G06K 7/10455; G06K 7/10861; G06K 15/024; G06K 15/027; G06K 19/07773
See application file for complete search history.

(56) References Cited

U.S. PATENT DOCUMENTS

| | | | |
|---|---|---|---|
| 2014/0035734 A1 | 2/2014 | Yamamoto | |
| 2019/0370623 A1 | 12/2019 | Tsuchimoto | |
| 2021/0122169 A1* | 4/2021 | Koike | ........................ B41J 3/50 |
| 2022/0001680 A1 | 1/2022 | Kuniya | |
| 2022/0004724 A1* | 1/2022 | Tsuchida | ............ G06K 7/10356 |

FOREIGN PATENT DOCUMENTS

| | | |
|---|---|---|
| JP | 2014-32491 A | 2/2014 |
| JP | 2019-211893 A | 12/2019 |
| JP | 2022-14375 A | 1/2022 |

* cited by examiner

*Primary Examiner* — Laura A Gudorf
(74) *Attorney, Agent, or Firm* — Kenealy Vaidya LLP

(57)               ABSTRACT

A wireless communication device includes a conveyance portion, a sensor, and a communication portion, and conveys a long backing sheet, a plurality of labels, each provided with a wireless tag, being adhered with intervals in a lengthwise direction of the backing sheet. The wireless communication device detects, by the sensor, an end portion on an upstream side of the label including a wireless tag adhered on the backing sheet, while conveying the backing sheet in a conveyance direction by the conveyance portion, and performs a wireless communication with a target label when the backing sheet is conveyed by a predetermined amount in the conveyance direction. The predetermined amount is decided based on a communication state, between the communication portion and the wireless tag, detected at each of positions when the backing sheet is sequentially conveyed to a plurality of positions in the conveyance direction.

9 Claims, 11 Drawing Sheets

FIG. 5

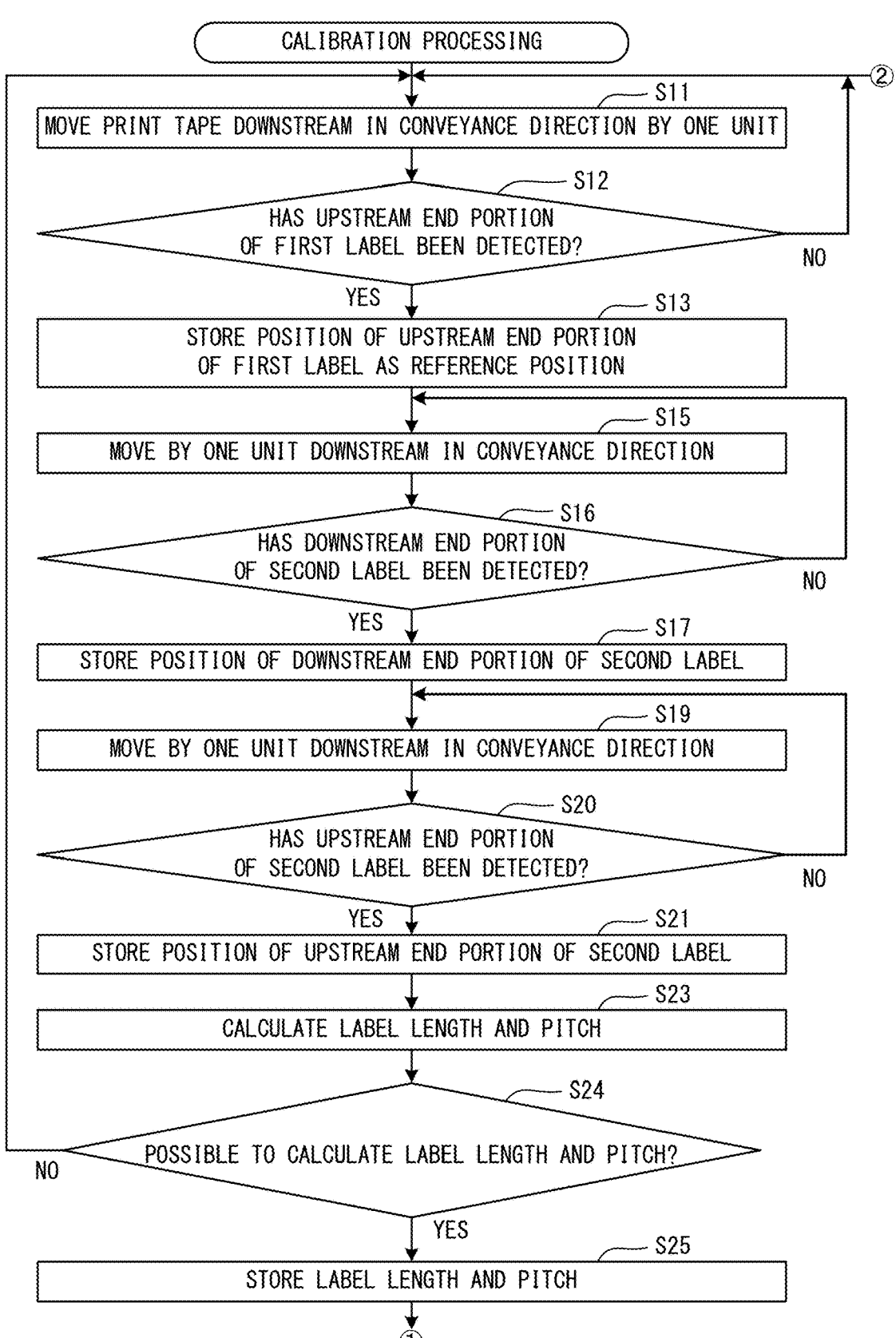

CALIBRATION PROCESSING

②

S11
MOVE PRINT TAPE DOWNSTREAM IN CONVEYANCE DIRECTION BY ONE UNIT

S12
HAS UPSTREAM END PORTION
OF FIRST LABEL BEEN DETECTED?
NO

YES

S13
STORE POSITION OF UPSTREAM END PORTION
OF FIRST LABEL AS REFERENCE POSITION

S15
MOVE BY ONE UNIT DOWNSTREAM IN CONVEYANCE DIRECTION

S16
HAS DOWNSTREAM END PORTION
OF SECOND LABEL BEEN DETECTED?
NO

YES

S17
STORE POSITION OF DOWNSTREAM END PORTION OF SECOND LABEL

S19
MOVE BY ONE UNIT DOWNSTREAM IN CONVEYANCE DIRECTION

S20
HAS UPSTREAM END PORTION
OF SECOND LABEL BEEN DETECTED?
NO

YES

S21
STORE POSITION OF UPSTREAM END PORTION OF SECOND LABEL

S23
CALCULATE LABEL LENGTH AND PITCH

S24
POSSIBLE TO CALCULATE LABEL LENGTH AND PITCH?
NO

YES

S25
STORE LABEL LENGTH AND PITCH

①

WIRELESS COMMUNICATION DEVICE

REFERENCE TO RELATED APPLICATIONS

This application claims priority from Japanese Patent Application No. 2023-106723 filed on Jun. 29, 2023. The entire content of the priority application is incorporated herein by reference.

BACKGROUND ART

The present disclosure relates to a wireless communication device capable of wireless communication with a wireless tag.

A wireless tag writer of known art is provided, on a conveyance path along which a label backing sheet is conveyed, with an antenna that writes information to an RFID tag formed on a label sheet. A mark sensor is disposed on an upstream side, in a conveyance direction, of a position at which the antenna is disposed, and the mark sensor detects a black mark indicating a leading position of the label sheet (a position of an edge of the label sheet on a downstream side in the conveyance direction). The wireless tag writer conveys the label backing sheet by an amount corresponding to a label length and a label interval of the label sheet, and performs calibration of a writing position at which the information is written to the wireless tag, and calibration of a strength of a wireless output.

SUMMARY

Sometimes a label backing sheet is used in which a distance from the leading position of the label sheet subsequent to the label sheet that is the target of the writing onto the wireless tag, to a formation position of the wireless tag of the label sheet that is the target of the writing is shorter than a distance between the antenna and the mark sensor. In this case, even when the label backing sheet is conveyed by the amount corresponding to the label length and the label interval, the wireless tag of the label sheet that is the target of the writing does not reach the position of the antenna. As a result, after continuing conveyance to the position of the wireless tag and writing the information, it is necessary for the wireless tag writer to convey the label backing sheet in a reverse direction to the leading position of the label sheet.

On the other hand, when the wireless tag writer has a configuration in which a sensor for detecting the label sheet is disposed on the downstream side of the antenna in the conveyance direction, the label backing sheet is used on which the wireless tag of the label sheet that is the target of the writing is formed at a position close to the edge on the downstream side in the conveyance direction. In this case, in a state in which the sensor has detected the label sheet that is the target of the writing, the antenna may become close to the wireless tag of the subsequent label sheet. When this kind of state occurs during the calibration, it is possible that the wireless tag writer may erroneously recognize the writing position of the information to the wireless tag as a position corresponding to the wireless tag of the label sheet that is subsequent to the label sheet that is the target of the writing.

An object of the present disclosure is to provide a wireless communication device in which a sensor that detects a label can be disposed at a position at which an antenna is provided that performs wireless communication with a wireless tag on a conveyance path of a backing sheet.

An aspect of the present disclosure provides a wireless communication device including a conveyance portion, a sensor, a communication portion, a processor, and a memory. The conveyance portion is configured to convey a long backing sheet along a conveyance path with a lengthwise direction of the backing sheet as a conveyance direction. A plurality of labels are adhered with intervals in a lengthwise direction of the backing sheet. The labels are provided with a wireless tag each. The sensor is disposed facing the conveyance path in an intersecting direction. And the sensor is configured to detect an end portion of the label. The intersecting direction intersects a width direction of the backing sheet conveyed by the conveyance portion and intersects the conveyance direction. The communication portion is disposed facing the conveyance path in the intersecting direction. And the communication portion is provided with an antenna. The antenna is configured to perform the wireless communication with the wireless tag. The memory stores computer-readable instructions to be executed by the processor. When the computer-readable instructions are executed by the processor, the processor detects, using the sensor, the end portion on an upstream side of the label, while conveying the backing sheet in the conveyance direction using the conveyance portion. The label is on a downstream side, in the conveyance direction, of a target label and is adhered at a position adjacent to the target label. And the target label is, of the plurality of labels, the label that is a target of communication by the communication portion. Subsequently, the processor performs the wireless communication with the target label, using the communication portion, when the backing sheet is conveyed by a predetermined amount in the conveyance direction by the conveyance portion. After the end portion on the upstream side in the conveyance direction of a chosen one of the labels, of the plurality of labels, is detected by the sensor, the predetermined amount is decided based on a communication state, between the communication portion and the wireless tag, detected at each of positions when the backing sheet is sequentially conveyed to a plurality of positions in the conveyance direction using the conveyance portion. When seen in the intersecting direction, the sensor is disposed, with respect to the antenna, between a first end and a second end of the antenna in the conveyance direction. In the above-described wireless communication device, since the sensor is disposed between the first end and the second end of the antenna in the conveyance direction, the wireless communication device can appropriately decide a communication position with respect to the wireless tag of the target label.

BRIEF DESCRIPTION OF DRAWINGS

FIG. 5 is a flowchart (1/2) of calibration processing.

DESCRIPTION

Hereinafter, an embodiment of the present disclosure will be described with reference to the drawings. Note that the referenced drawings are used to illustrate technological features that can be adopted by the present disclosure. Illustrated configurations, flowcharts of various processing, and the like are not intended to limit the present disclosure to the embodiment alone, and are simply explanatory examples.

Figure 1:
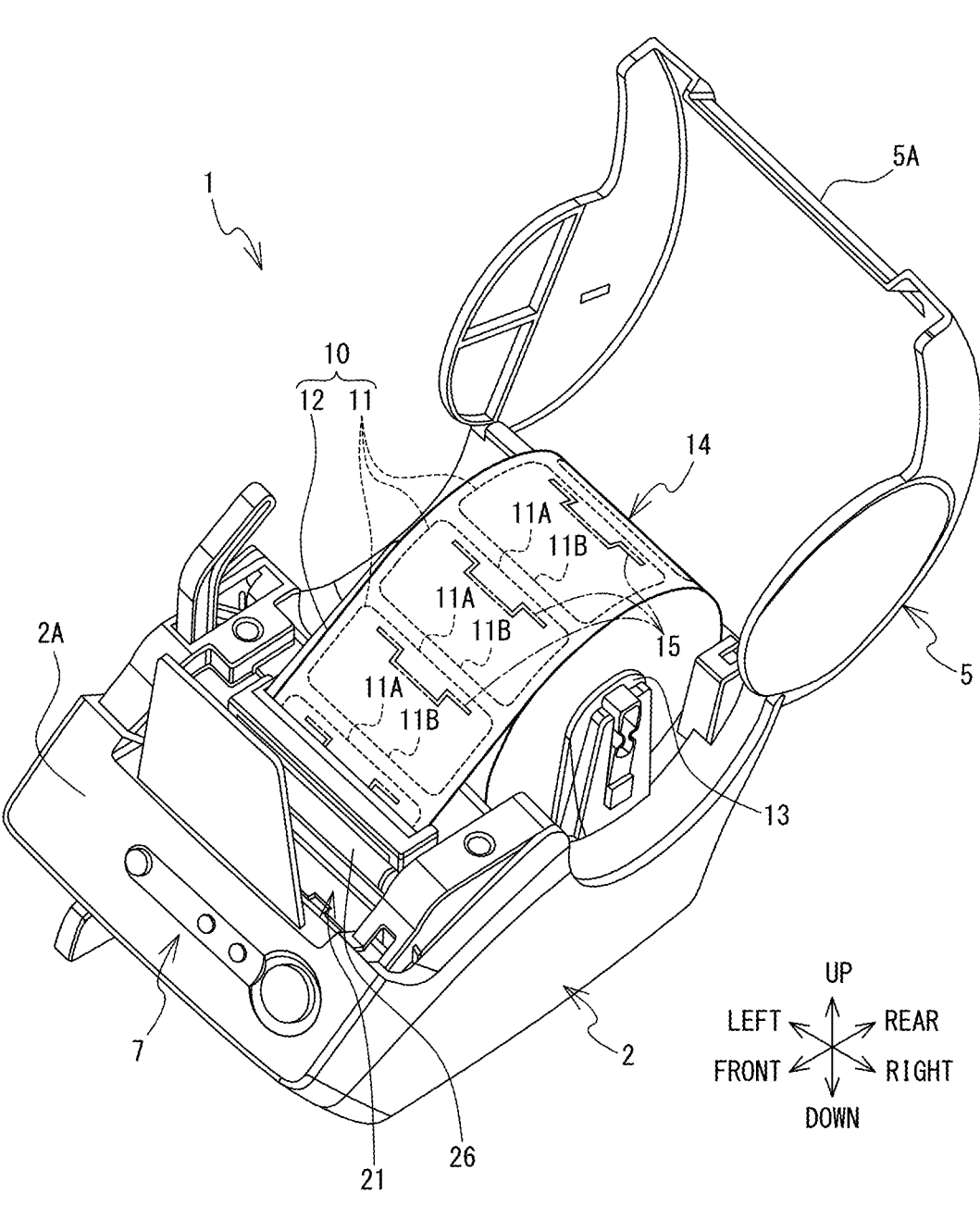
FIG. 1 is a perspective view of a print device 1.

An overall configuration of a print device 1 will be described with reference to FIG. 1 and FIG. 2. In the following description, the upper right side, the lower left side, the lower right side, the upper left side, the upper side, and the lower side of FIG. 1 are, respectively, the rear side, the front side, the right side, the left side, the upper side, and the lower side of the print device 1.

The print device 1 can print characters, numerals, symbols, graphics, and the like on a print tape 10. The print device 1 is provided with a housing 2 and a cover 5. The cover 5 is provided above the housing 2, and can open and close the housing 2. An operation portion 7 is provided at a front surface 2A of the housing 2. The operation portion 7 includes a power button and the like, and can input various pieces of information to the print device 1.

A tape roll 14 is detachably housed at a rear portion of the interior of the housing 2. The tape roll 14 is configured by winding the print tape 10 on a core 13 with a print surface 10A of the print tape 10 wound on the inner side, and the tape roll 14 can rotate around the core 13. When the cover 5 is in a closed state, a discharge port 21 is formed between a front end 5A of the cover 5 and the front surface 2A of the housing 2. A thermal head 28 is provided to the rear of the discharge port 21. A platen roller 26 is provided above the thermal head 28.

The platen roller 26 faces the thermal head 28, and can move in the up-down direction in accordance with the opening and closing of the cover 5. When the cover 5 is in the closed state, the print tape 10 is sandwiched between the platen roller 26 and the thermal head 28. The print surface 10A of the print tape 10 is oriented to the side of the thermal head 28. When the cover 5 is in an open state, the platen roller 26 is separated upward from the thermal head 28. As a result of the platen roller 26 being driven to rotate by a conveyance motor 29 (refer to FIG. 3) when the cover 5 is in the closed state, the platen roller 26 conveys the print tape 10 along a conveyance path 22 from the tape roll 14 toward the discharge port 21. The conveyance path 22 passes between a light projecting portion 31 and a light receiving portion 32 of an optical sensor 30 to be described below, and between the platen roller 26 and the thermal head 28, and extends toward the discharge port 21 provided in the upper surface of the print device 1. The thermal head 28 performs printing on the print tape 10 conveyed by the platen roller 26. Note that a conveyance amount of the print tape 10 is identified based on a signal output from an encoder 29A (refer to FIG. 3) provided in the conveyance motor 29.

The optical sensor 30 and an antenna substrate 40 are provided to the rear of the platen roller 26. The optical sensor 30 is a sensor for detecting end portions 11A and 11B of a label 11 to be described later, and includes the light projecting portion 31 and the light receiving portion 32. The light projecting portion 31 is disposed to the rear of the platen roller 26, and the light receiving portion 32 is disposed diagonally above and to the rear of the platen roller 26. The light projecting portion 31 and the light receiving portion 32 are disposed on either side of the conveyance path 22 of the print tape 10 and face each other. At a position at which the light projecting portion 31 and the light receiving portion 32 face each other, the print tape 10 is conveyed in a conveyance direction in which an upstream side is an upper rear side, and a downstream side is a lower front side. Note that the conveyance path 22 of the print tape 10 is bent at each of locations inside the print device 1, and when the conveyance direction of the print tape 10 is referred to in the following description, this refers to the direction in which the print tape 10 is conveyed at the position at which the light projecting portion 31 and the light receiving portion 32 face each other (refer to FIG. 2). A direction, in the print surface 10A of the print tape 10, intersecting the conveyance direction is referred to as a width direction of the print tape 10. A direction intersecting the conveyance direction and the width direction is referred to as an intersecting direction. The light projecting portion 31 and the light receiving portion 32 face each other in the intersecting direction. The light projecting portion 31 is positioned below the conveyance path 22 in the intersecting direction, and the light receiving portion 32 is positioned above the conveyance path 22.

The antenna substrate 40 is disposed between the light projecting portion 31 and the light receiving portion 32. An antenna 45 is provided on the antenna substrate 40. The antenna 45 transmits radio waves for writing data to a wireless tag 15, and receives radio waves transmitted from the wireless tag 15.

The print device 1 can handle a plurality of types of the print tape 10. The types of the print tape 10 include a tape width, a tape color, a tape material, and the like. For example, the type of the print tape 10 includes a multi-layer tape that includes an adhesive between a long print label and a release sheet, a single-layer tape that does not include an adhesive, and the like. The print tape 10 according to the present embodiment is a die-cut tape in which a plurality of the labels 11 are adhered to a long backing sheet 12 with intervals therebetween, in a lengthwise direction of the print tape 10. The plurality of labels 11 are adhered to a surface (the surface on the side of the print surface 10A of the print tape 10) of the backing sheet 12. The wireless tag 15 is provided on each of the plurality of labels 11. The wireless tag 15 is a known RFID tag including an IC chip and an antenna. The wireless tag 15 is adhered, using an adhesive, to a reverse surface (a mating surface with the backing sheet 12) of each of the plurality of labels 11, at a position close to the end portion 11A on the upstream side in the conveyance direction of the print tape 10. The wireless tag 15 is a passive RFID tag, but may be an active RFID tag.

Figure 3:
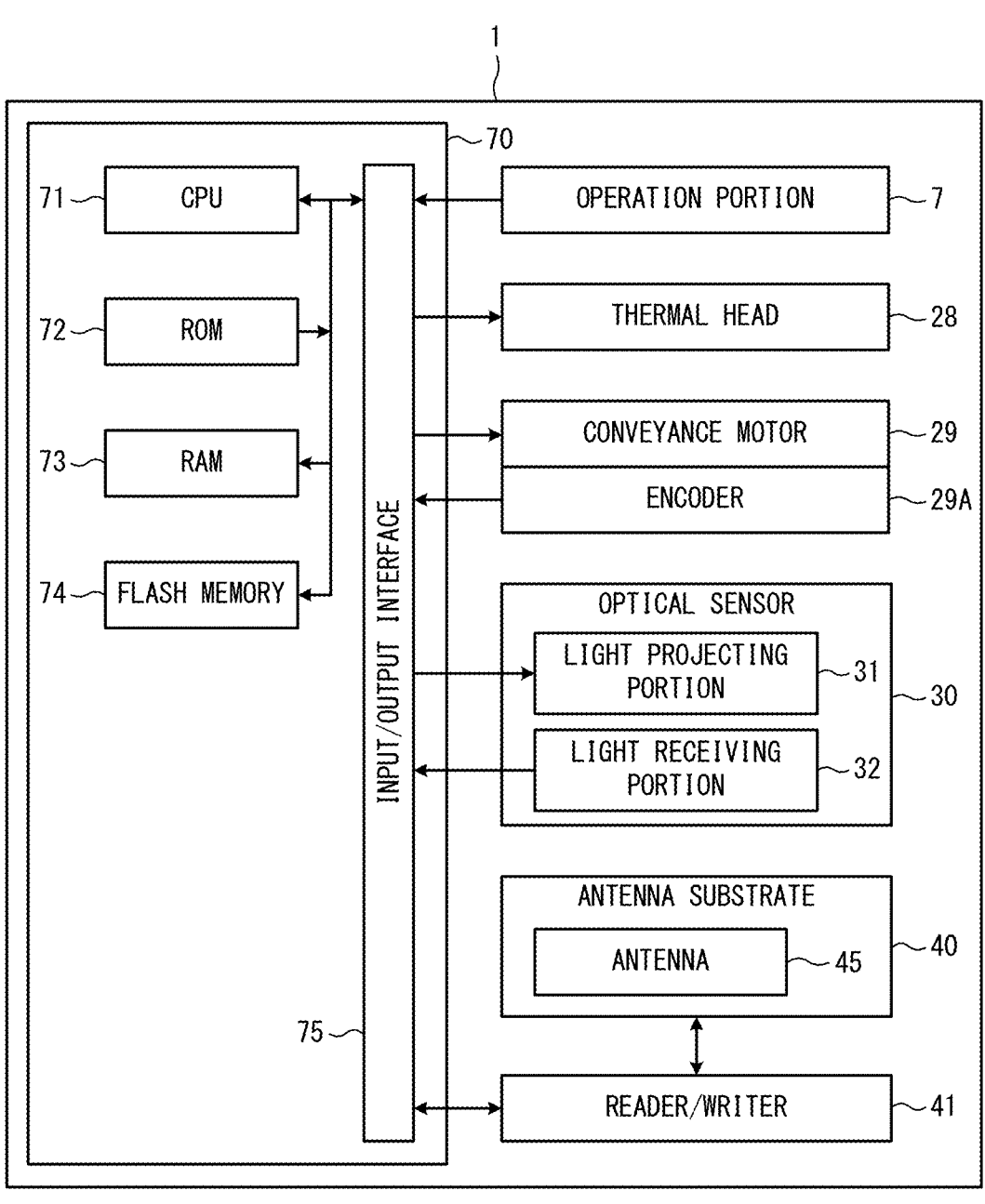
FIG. 3 is a block diagram illustrating an electrical configuration of the print device 1.

An electrical configuration of the print device 1 will be described with reference to FIG. 3. The print device 1 is provided with a control board 70. A CPU 71, a ROM 72, a RAM 73, a flash memory 74, and an input/output interface 75 are connected to each other and are provided on the control board 70. The CPU 71 controls the print device 1. The ROM 72 stores various parameters and the like that are necessary when the CPU 71 executes various programs. The RAM 73 temporarily stores various information, such as arithmetic results by the CPU 71 and the like. The flash memory 74 stores the various programs and the like executed by the CPU 71. The various programs include a program for calibration processing to be described below. The operation portion 7, the thermal head 28, the conveyance motor 29, the encoder 29A, the optical sensor 30, and a reader/writer 41 are connected to the input/output interface 75.

The operation portion 7 receives input of various information by a user. The thermal head 28 is provided, at a position facing the platen roller 26, with a plurality of heater elements (not illustrated) arrayed in a row in the width direction of the print tape 10 conveyed along the conveyance path 22. Using the heater elements, the thermal head 28 performs the printing on the print tape 10 sandwiched between the platen roller 26 and the heater elements.

The encoder 29A outputs, to the CPU 71, a signal that accords with a rotation amount of the conveyance motor 29. Based on the signal output from the encoder 29A, the CPU 71 can identify the rotation amount of the conveyance motor 29. Furthermore, based on the identified rotation amount and a diameter of the platen roller 26, the CPU 71 can identify the conveyance amount of the print tape 10 conveyed by the platen roller 26. Note that, in the present embodiment, this is performed by the CPU 71 synchronizing sampling of a signal output by the optical sensor 30 and sampling of the signal output by the encoder 29A.

The optical sensor 30 is a transmission type sensor. The light projecting portion 31 emits detection light in the intersecting direction toward the conveyance path 22. The light receiving portion 32 receives transmitted light, which is the detection light that has been transmitted through the conveyed print tape 10. Based on an intensity of the transmitted light acquired from the optical sensor 30, the CPU 71 can identify the end portions 11A and 11B of the label 11. In other words, based on an intensity of the transmitted light transmitted through a section of the backing sheet 12, and on an intensity of the transmitted light transmitted through a section of the backing sheet 12 and the label 11, the CPU 71 can identify positions at which there is a significant change in the intensity of the transmitted light, as the positions of the end portions 11A and 11B of the label 11. Note that, since the detection light is not transmitted through the print tape 10 at a position at which the wireless tag 15 is provided, the CPU 71 can remove the position of the wireless tag 15 from a detection target position of the end portions 11A and 11B of the label 11.

The reader/writer 41 is a known radio frequency identification (RFID) reader/writer. The reader/writer 41 is connected to the antenna substrate 40. Via the antenna 45, the reader/writer 41 is connected by wireless communication to the wireless tag 15 provided on the label 11, and performs the reading and writing of data.

Figure 4:
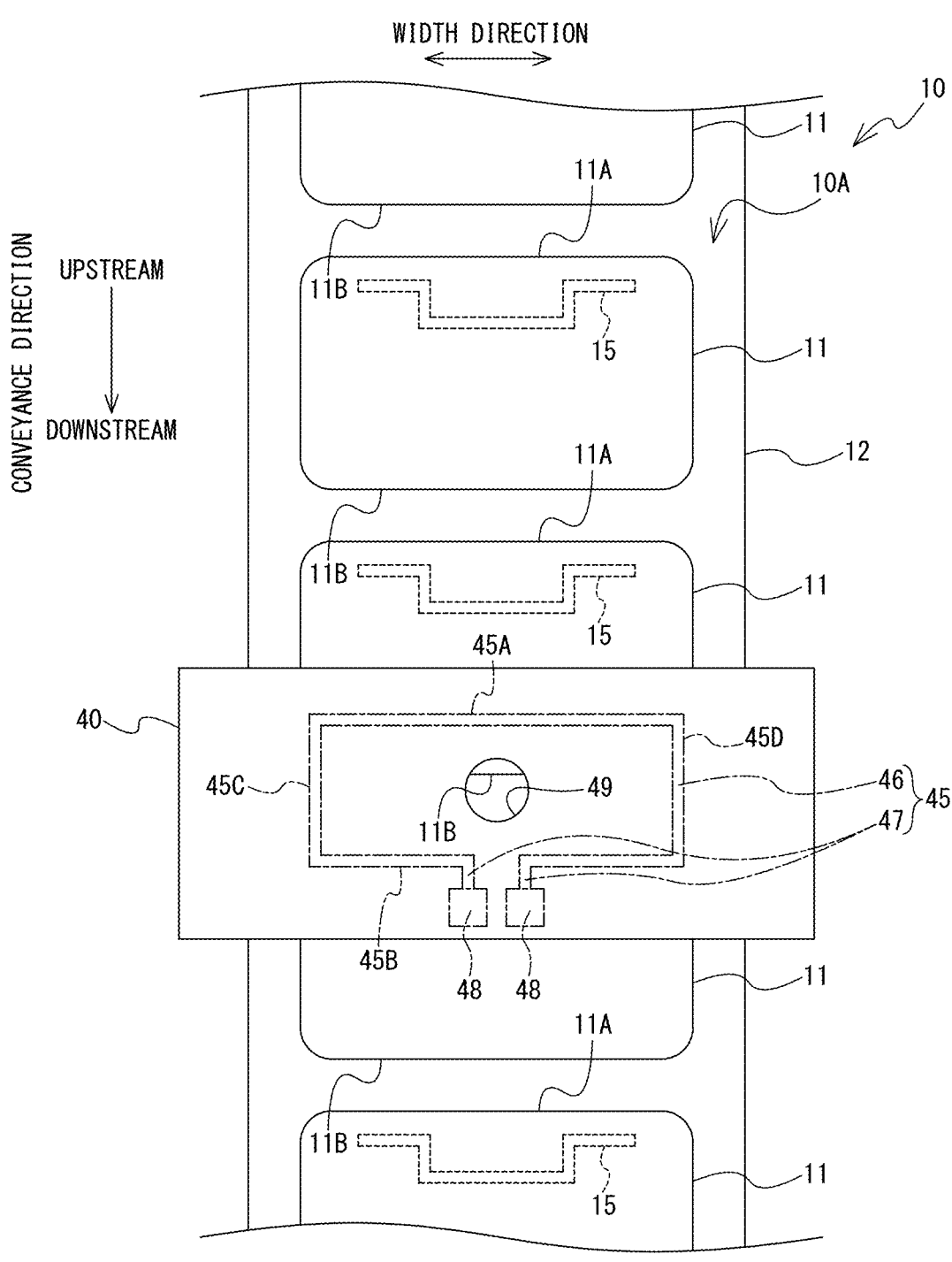
FIG. 4 is a plan view of a print tape 10 and an antenna substrate 40.

A format of the antenna 45 provided on the antenna substrate 40 will be described with reference to FIG. 4. The antenna substrate 40 is disposed below the conveyance path 22 (refer to FIG. 2). The antenna 45 is formed as a wiring pattern on a first surface 40A (refer to FIG. 2) that is oriented to the side of the conveyance path 22. The antenna 45 includes an antenna portion 46 and power supply wiring portions 47. In the first surface 40A, the antenna portion 46 is formed in a ring shape surrounding a central section of the first surface 40A. Both ends of the antenna portion 46 are respectively connected to the pair of power supply wiring portions 47. A pair of connector portions 48 are provided on the first surface 40A for connecting to the reader/writer 41.

The pair of power supply wiring portions 47 are respectively connected to the pair of connector portions 48, thus electrically connecting the connector portions 48 and the antenna portion 46. The antenna 45 that transmits and receives the radio waves for wireless connection using the ring-shaped antenna portion 46 is a so-called loop antenna. A through hole 49 that penetrates in a thickness direction of the substrate is formed in the first surface 40A. The through hole 49 is formed inside the ring of the ring-shaped antenna portion 46, and does not interfere with the antenna portion 46.

Figure 2:
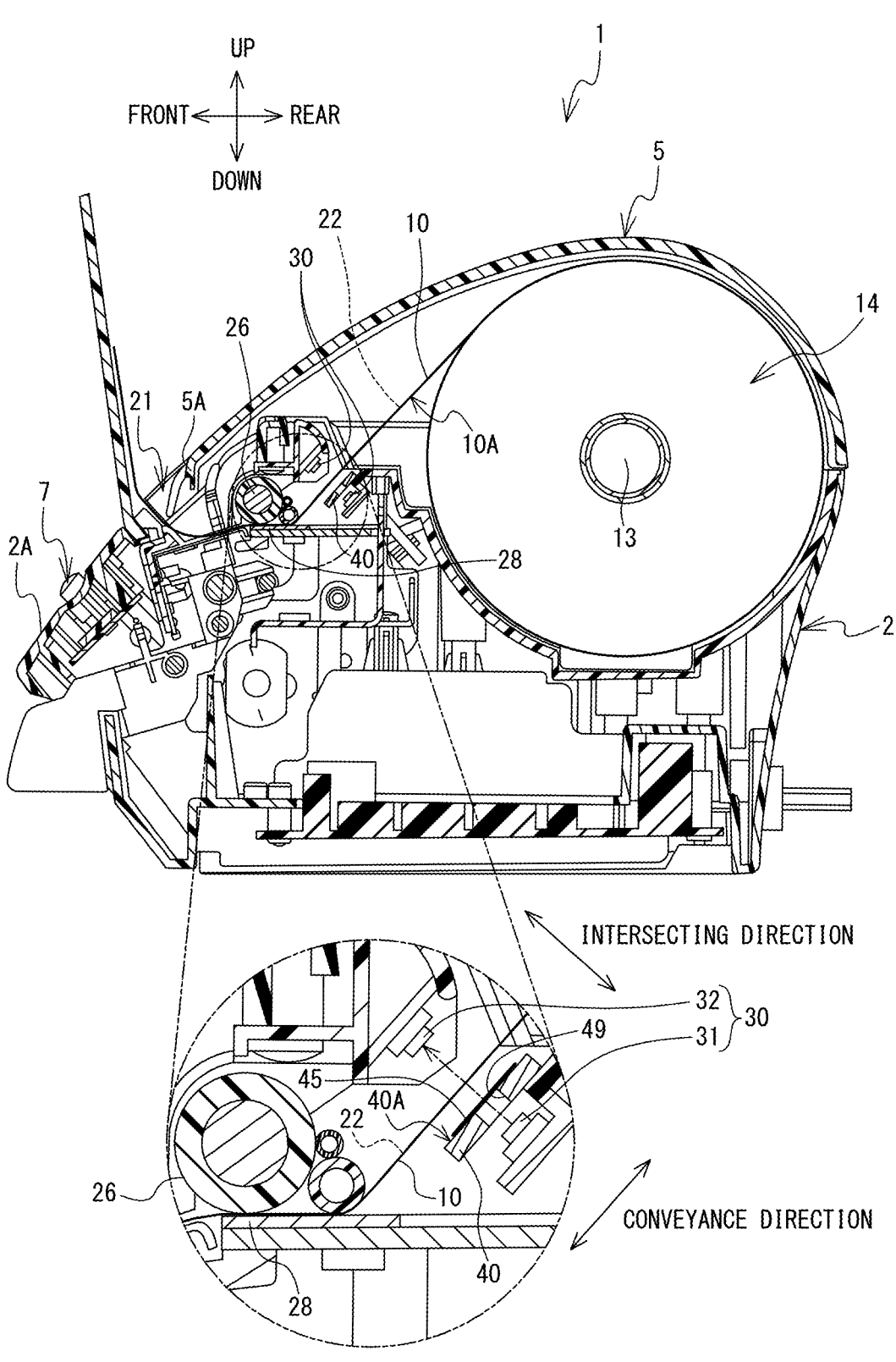
FIG. 2 is a cross-sectional view of the print device 1 in a state in which a cover 5 is closed.

As illustrated in FIG. 2, between the light projecting portion 31 and the light receiving portion 32 of the optical sensor 30, the antenna substrate 40 is disposed such that the thickness direction of the substrate is oriented in the intersecting direction in which the light projecting portion 31 and the light receiving portion 32 of the optical sensor 30 face each other. The through hole 49 is disposed at a position of the light projecting portion 31 and the light receiving portion 32 in a plan view in the intersecting direction. The light receiving portion 32 can receive the detection light that is emitted from the light projecting portion 31 and that has passed through the through hole 49. In other words, a formation position of the through hole 49 in the antenna substrate 40 is an arrangement position of the optical sensor 30 in a plan view in the intersecting direction. It is sufficient that the formation position of the through hole 49 is a position at which there is no interference with the antenna 45, in a formation range of the ring-shaped antenna 45. The formation range of the antenna 45 in the conveyance direction is a range between a first end portion 45A, of the antenna portion 46, on the upstream side in the conveyance direction, and a second end portion 45B on the downstream side in the conveyance direction. The formation range of the antenna 45 in the width direction is a range between a first end portion 45C on one side in the width direction of the antenna portion 46 and a second end portion 45D on the other side in the width direction. The formation position of the through hole 49, that is, the arrangement position of the optical sensor 30, is preferably a position at which a radio wave strength is strongest when a signal is output from the loop antenna, and is favorably a position at the center of the ring in the ring-shaped antenna portion 46, or a position in the vicinity of the center.

Figure 6:
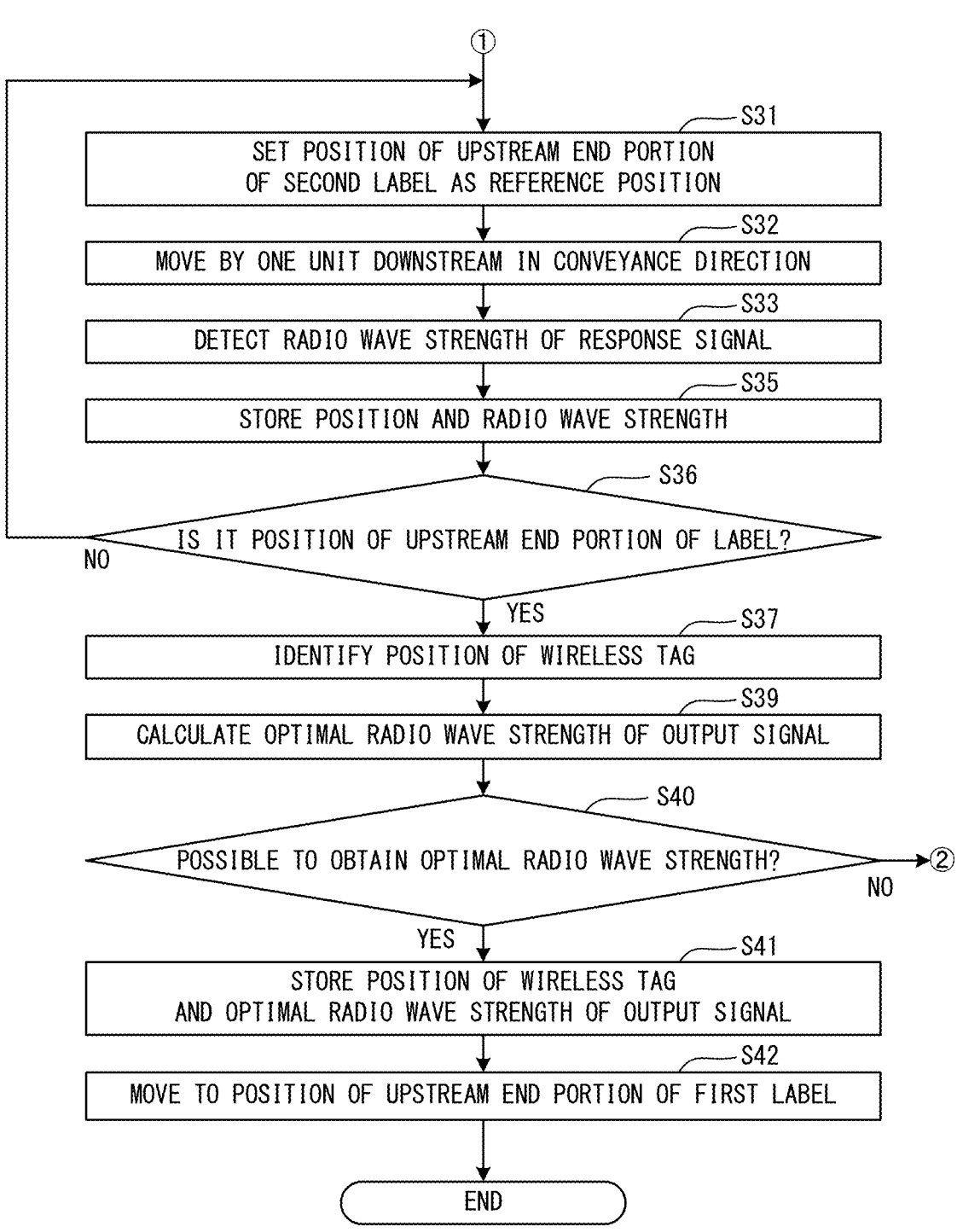
FIG. 6 is a flowchart (2/2) of calibration processing.

The calibration processing will be described with reference to FIG. 5 and FIG. 6. The calibration processing is performed when the user has replaced the tape roll 14 of the print tape 10. When the print tape 10 pulled out from the tape roll 14 stored inside the housing 2 is disposed on the conveyance path 22 and the cover 5 is closed, the CPU 71 reads out and executes the program for the calibration processing stored in the flash memory 74.

The CPU 71 moves the print tape 10 downstream in the conveyance direction by an amount corresponding to one unit (S11). The one unit is, for example, a predetermined conveyance amount set in advance as the conveyance amount of the print tape 10 conveyed by the platen roller 26.

Based on a change in strength of the output signal of the optical sensor 30, the CPU 71 identifies the end portion 11A on the upstream side of the label 11 in the conveyance direction. When the end portion 11A on the upstream side in the conveyance direction is not detected by the optical sensor 30 (no at S12), the CPU 71 returns the processing to S11, and moves the print tape 10 downstream in the conveyance direction by the amount corresponding to the one unit. When the end portion 11A on the upstream side in the conveyance direction has been detected by the optical sensor 30 (yes at S12), the CPU 71 sets that label 11 as a first of the labels 11 (the first label 11), and, based on a conveyance amount of the print tape 10 up to that point in time, stores the position of the end portion 11A on the upstream side of the first label 11 in the conveyance direction in the flash memory 74, as a reference position.

The CPU 71 moves the print tape 10 downstream in the conveyance direction by the amount corresponding to the one unit (S15). Based on the change in strength of the output signal of the optical sensor 30, the CPU 71 identifies the end portion 11B on the downstream side of a second of the labels 11 (the second label 11) that is adhered at a position adjacent to and upstream of the first label 11 in the conveyance direction. When the end portion 11B on the downstream side in the conveyance direction is not detected by the optical sensor 30 (no at S16), the CPU 71 returns the processing to S15, and moves the print tape 10 downstream in the con-veyance direction by the amount corresponding to the one unit. When the end portion 11B on the downstream side in the conveyance direction of the second label 11 has been detected by the optical sensor 30 (yes at S16), based on a conveyance amount of the print tape 10 from the reference position, the CPU 71 stores the position of the end portion 11B on the downstream side of the second label 11 in the conveyance direction in the flash memory 74 (S17).

The CPU 71 moves the print tape 10 downstream in the conveyance direction by the amount corresponding to the one unit (S19). Based on the change in strength of the output signal of the optical sensor 30, the CPU 71 identifies the end portion 11A on the upstream side of the second label 11 in the conveyance direction. When the end portion 11A on the upstream side in the conveyance direction is not detected by the optical sensor 30 (no at S20), the CPU 71 returns the processing to S19, and moves the print tape 10 downstream in the conveyance direction by the amount corresponding to the one unit. When the end portion 11A on the upstream side of the second label 11 in the conveyance direction has been detected by the optical sensor 30 (yes at S20), based on the conveyance amount of the print tape 10 from the reference position, the CPU 71 stores the position of the end portion 11A on the upstream side of the second label 11 in the conveyance direction in the flash memory 74 (S21).

Based on the position of the end portion 11A on the upstream side of the first label 11 in the conveyance direc-tion (the reference position), and on the position of the end portion 11B on the downstream side of the second label 11 in the conveyance direction, the CPU 71 calculates a pitch indicating a length between the labels 11 in the conveyance direction. Further, based on the position of the end portion 11B on the downstream side of the second label 11 in the conveyance direction, and on the position of the end portion 11A on the upstream side of the second label 11 in the conveyance direction, the CPU 71 calculates a label length indicating the length of the label 11 in the conveyance direction (S23). When it is not possible to identify the end portions 11A and 11B due to noise, erroneous detection, or the like, and it is not possible to calculate the label length and the pitch (no at S24), the CPU 71 returns the processing to S11 and performs the calibration of the label length and the pitch once more. When the label length and the pitch have been normally calculated (yes at S24), the CPU 71 stores the label length and the pitch in the flash memory 74 (S25).

Next, the CPU 71 takes a third of the labels 11 (the third label 11) as a target (the target label 11) that is the target for performing the wireless communication with the wireless tag 15 in the calibration processing, and sets the position of the end portion 11A on the upstream side of the second label 11 in the conveyance direction as the reference position (S31). The CPU 71 moves the print tape 10 downstream in the conveyance direction by the amount corresponding to the one unit (S32). The CPU 71 transmits an output signal when performing the writing to the wireless tag 15, and detects the radio wave strength of a response signal received from the wireless tag 15 (S33). The CPU 71 associates the radio wave strength of the response signal with the position based on the conveyance amount of the print tape 10 up to that point in time, and stores the associated position and radio wave strength in the flash memory 74 (S35).

Based on the change in strength of the output signal of the optical sensor 30, the CPU 71 identifies the end portion 11A on the upstream side of the third label 11 in the conveyance direction. When the end portion 11A on the upstream side in the conveyance direction is not detected by the optical sensor 30 (no at S36), the CPU 71 returns the processing to S31, and moves the print tape 10 downstream in the con-veyance direction by the amount corresponding to the one unit. By repeating the processing from S32 to S36, a map is created by detecting the radio wave strength of the response signal at a plurality of positions separated in the conveyance direction from the reference position of the target label 11. When the end portion 11A on the upstream side of the target label 11 in the conveyance direction is detected by the optical sensor 30 (yes at S36), based on the map of the radio wave strength of the response signal, the CPU 71 identifies an optimal position for performing the wireless communi-cation with the wireless tag 15 (S37).

Next, so that the wireless tag 15 of the label 11 other than the target label 11 does not respond, based on the map of the radio wave strength of the response signal, the CPU 71 calculates an optimal radio strength of the output signal when performing the writing to the wireless tag 15 (S39). When, due to noise, erroneous detection, or the like, it is not possible to calculate the optimal radio wave strength of the output signal from the map of the radio wave strength of the response signal (no at S40), the CPU 71 returns the pro-cessing to S11, and repeats the calibration processing from the start. When it is possible to calculate the optimal radio wave strength of the output signal (yes at S40), the CPU 71 stores the position of the wireless tag 15 and the optimal radio wave strength of the output signal in the flash memory 74 (S41). The CPU 71 uses the position of the end portion 11A on the upstream side of the first label 11 in the conveyance direction as the reference position, conveys the print tape 10 in the reverse direction, and thus moves the position of the optical sensor 30 to the reference position (S42). The CPU 71 sets the second label 11 as the target label 11 that is the target of the printing and the data writing, and ends the calibration processing.

Subsequently, by executing another program for issuing labels, the processing to perform the printing on the target label 11 and to write the data to the wireless tag 15 is executed. The CPU 71 starts the rotation of the conveyance motor 29. The platen roller 26 rotates as a result of the rotational driving of the conveyance motor 29. The platen roller 26 conveys the print tape 10 from the tape roll 14 toward the discharge port 21. The print tape 10 is conveyed downstream along the conveyance path 22. When a printing position of the target label 11 is at the position of the heater elements of the thermal head 28, the CPU 71 performs a printing operation based on the print data. When, based on the conveyance amount from the reference position, the print tape 10 is conveyed to a position for performing the optimal wireless communication with the wireless tag 15 of the target label 11, the CPU 71 transmits the radio waves for the wireless communication from the antenna 45, using the reader/writer 41, and writes the data to the wireless tag 15. When the printing on the target label 11 and the writing of the data are complete, the CPU 71 conveys the print tape 10, and discharges the target label 11 to the outside of the housing 2 from the discharge port 21, thus ending the issuing of the label 11.

As described above, when the antenna substrate 40 is seen in a plan view in the intersecting direction, the optical sensor 30 is disposed, in the conveyance direction, between the end portion 45A of the antenna 45 on the upstream side, and the end portion 45B on the downstream side. Thus, the print device 1 can appropriately decide the communication position with respect to the wireless tag 15 of the target label 11.

The optical sensor 30 is the transmission type sensor that includes the light projecting portion 31 and the light receiving portion 32. By detecting the end portions of the label 11 using the optical sensor 30, it is possible to eliminate the time and effort to form the detection marks 16 for detecting the end portions 11A and 11B of the label 11 on the backing sheet 12 of the print tape 10, for example, and it is possible to reduce the cost of the label 11.

When the antenna substrate 40 is seen in a plan view in the intersecting direction, the position at which the optical sensor 30 is disposed is the position at which the radio wave strength in the antenna 45 is strongest when the antenna 45 outputs the signal, or is in the vicinity of that position. With this configuration, the distance from the position at which the optical sensor 30 detects the end portion 11A on the upstream side of the label 11 that is not the target of the writing and that is positioned downstream of the target label 11, to the communication position with the wireless tag 15 is substantially the same as the conveyance distance of the backing sheet 12. Thus, the print device 1 does not erroneously write the information to the wireless tag 15 of the label 11 that is not the target of the writing.

The antenna 45 is the loop antenna. Since the antenna portion 46 and the power supply wiring portions 47 are formed on the antenna substrate 40 as the wiring pattern, the formation of the antenna 45 is easy. Further, since it is sufficient to dispose the optical sensor 30 inside the ring of the antenna portion 46, in the design of the antenna substrate 40, it is easy to set the position at which the optical sensor 30 is disposed.

By forming the through hole 49 in the antenna substrate 40, the detection light of the optical sensor 30 can pass through the through hole 49. With this configuration, it is possible to dispose the optical sensor 30 on the opposite side of the conveyance path 22 with respect to the antenna substrate 40. Thus, since it is possible to dispose the antenna 45 close to the conveyance path 22, the print device 1 can reliably write the information to the wireless tag 15.

In the above-described embodiment, the print device 1 is one example of the wireless communication device of the disclosure. The platen roller 26 and the conveyance motor 29 are one example of the conveyance portion of the disclosure, respectively. The optical sensor 30 is one example of the sensor of the disclosure. The antenna substrate 40 is one example of the communication portion of the disclosure. The CPU 71 is one example of the processor of the disclosure. The first surface 40A and the second surface 40B are one example of the first flat surface and the second flat surface of the disclosure, respectively.

Figure 7:
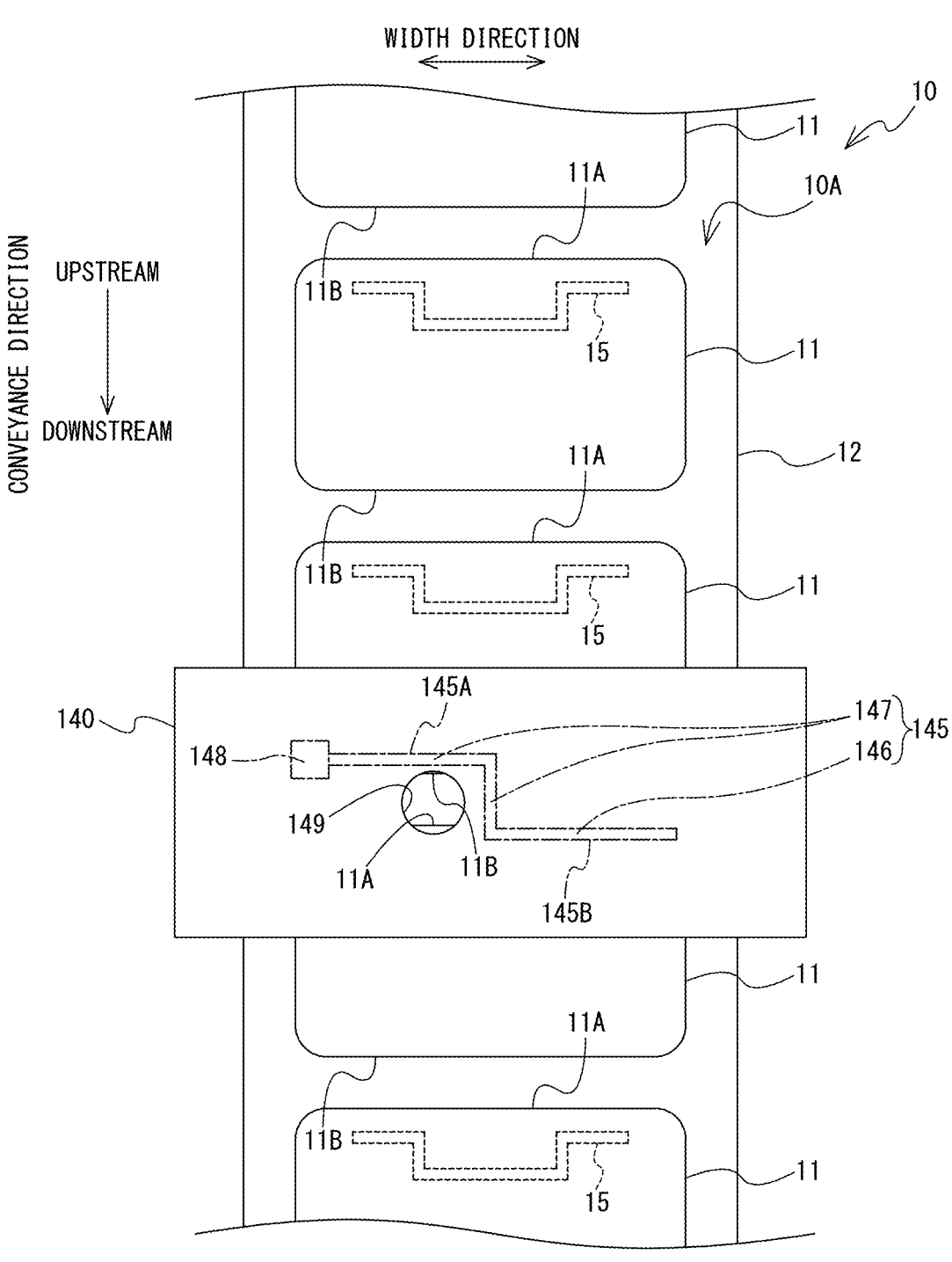
FIG. 7 is a plan view of the print tape 10 and an antenna substrate 140.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modifications can be made to the above-described embodiment. The loop antenna is formed on the antenna substrate 40, but an antenna having a different shape may be formed. For example, an antenna 145 illustrated in FIG. 7 is a so-called monopole antenna. The antenna 145 is formed as a wiring pattern on the first surface 40A (refer to FIG. 2), of an antenna substrate 140, that is oriented to the side of the conveyance path 22, and includes an antenna portion 146 and a power supply wiring portion 147. The antenna portion 146 extends in the width direction in the first surface 40A. A first end of the antenna portion 146 is connected to a first end of the power supply wiring portion 147. The power supply wiring portion 147 extends in the conveyance direction from the first end of the antenna portion 146, is bent, and then extends in a direction away from the antenna portion 146 in the width direction. A second end of the power supply wiring portion 147 is connected to a connector portion 148 for connecting to the reader/writer 41. A through hole 149 that penetrates in the thickness direction of the substrate is formed, in the first surface 40A, between a first end portion 145A on the upstream side of the antenna 45 in the conveyance direction and a second end portion 145B on the downstream side in the conveyance direction. The through hole 149 does not interfere with the antenna 145. A formation position of the through hole 149, that is, the arrangement position of the optical sensor 30, is preferably a position at which the radio wave strength is strongest when a signal is output from the monopole antenna, and it is sufficient that the formation position is a position between the first end portion 145A and the second end portion 145B of the antenna 145 in the conveyance direction, or a position in the vicinity thereof, in a formation range of the antenna portion 146 and the power supply wiring portion 147. Note that, in the width direction, it is sufficient that the optical sensor 30 is disposed inside a range of the length of the label 11 in the width direction, and at a position that does not interfere with the antenna portion 146 and the power supply wiring portion 147. In this way, the antenna 145 is the monopole antenna, and since it is possible to form the antenna portion 146 and the power supply wiring portion 147 in the antenna substrate 140 as the wiring pattern, the antenna 145 can be easily formed. Further, since it is sufficient that the optical sensor 30 is disposed in the formation range of the wiring pattern in the conveyance direction, in the design of the antenna substrate 140, the arrangement position of the optical sensor 30 is easily set.

Figure 8:
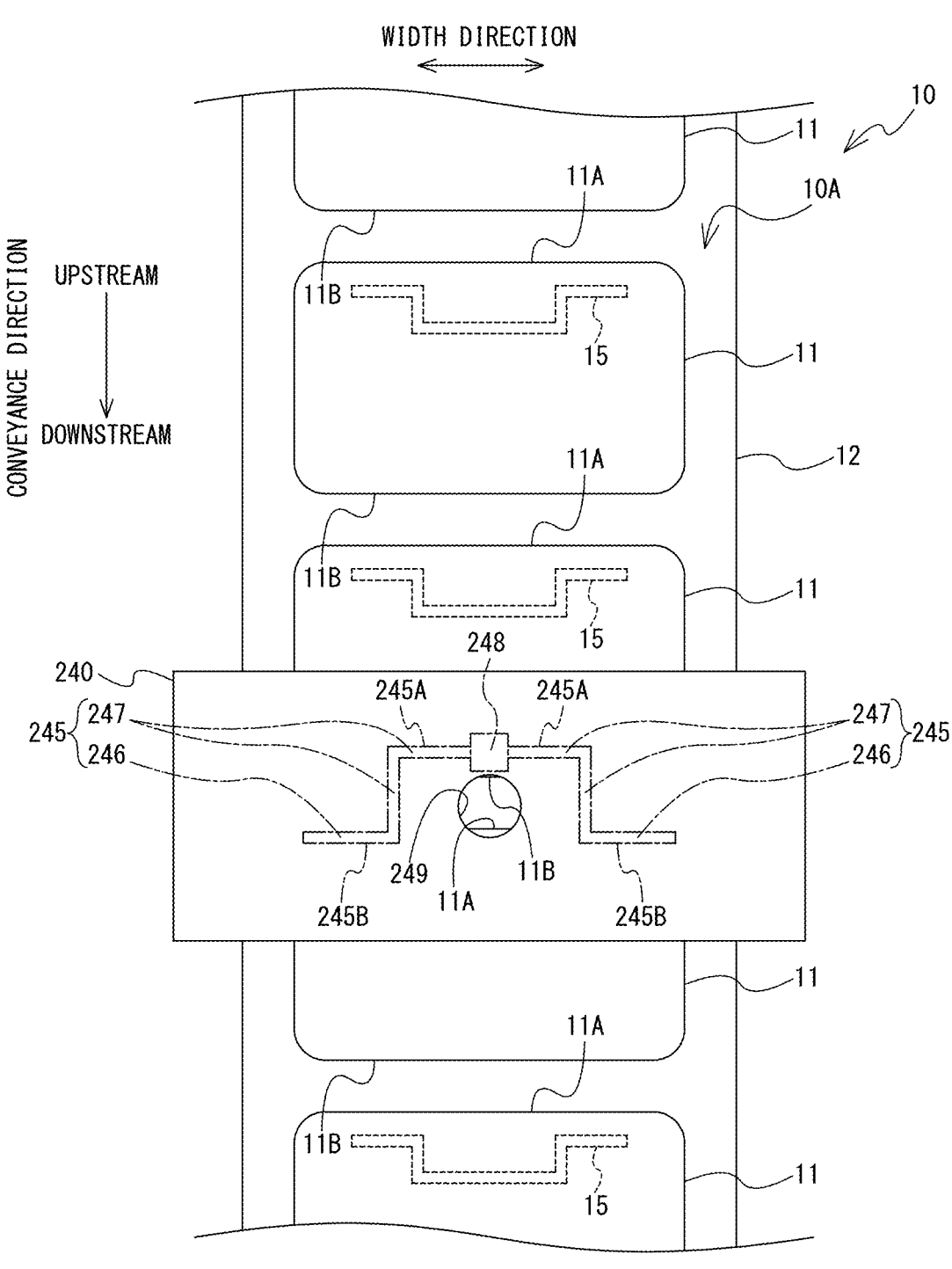
FIG. 8 is a plan view of the print tape 10 and an antenna substrate 240.

For example, an antenna 245 illustrated in FIG. 8 is a so-called dipole antenna. The antenna 245 is formed as a wiring pattern on the first surface 40A (refer to FIG. 2), of an antenna substrate 240, that is oriented to the side of the conveyance path 22, and includes antenna portions 246 and power supply wiring portions 247. The pair of antenna portions 246 are provided at positions separated from each other in the width direction, and each extends in the width direction in the first surface 40A. A first end of one of the antenna portions 246 and a first end of the other antenna portion 246 are respectively connected to first ends of a pair of the power supply wiring portions 247. Each of the power supply wiring portions 247 extends from the first end of the antenna portion 246 in the conveyance direction, is bent, and then each extends in a direction away from the antenna portion 246 to which it is connected, in the width direction (that is, extend in a direction approaching each other). Each of second ends of the power supply wiring portions 247 are connected to a single connector portion 248 for connecting to the reader/writer 41. The connector portion 248 is positioned at a center, in the width direction, of the pair of power supply wiring portions 247. A through hole 249 that penetrates in the thickness direction of the substrate is formed, in the first surface 40A, between a first end portion 245A on the upstream side of the antenna 245 in the conveyance direction and a second end portion 245B on the downstream side in the conveyance direction. The through hole 249 does not interfere with the antenna 245. A formation position of the through hole 249, that is, the arrangement position of the optical sensor 30, is preferably a position at which the radio wave strength is strongest when a signal is output from the dipole antenna, and it is sufficient that the formation position is a position between the first end portion 245A and the second end portion 245B of the antenna 245 in the conveyance direction, or a position in the vicinity thereof, in a formation range of the antenna portions 246 and the power supply wiring portions 247. Note that, in the width direction, it is sufficient that the optical sensor 30 is disposed inside a range of the length of the label 11 in the width direction, and at a position that does not interfere with the antenna portions 246 and the power supply wiring portions 247. In this way, the antenna 245 is the dipole antenna, and since it is possible to form the antenna portions 246 and the power supply wiring portions 247 in the antenna substrate 240 as the wiring pattern, the antenna 245 can be easily formed. Further, since it is sufficient that the optical sensor 30 is disposed in the formation range of the wiring pattern in the conveyance direction, in the design of the antenna substrate 240, the arrangement position of the optical sensor 30 is easily set.

Figure 9:
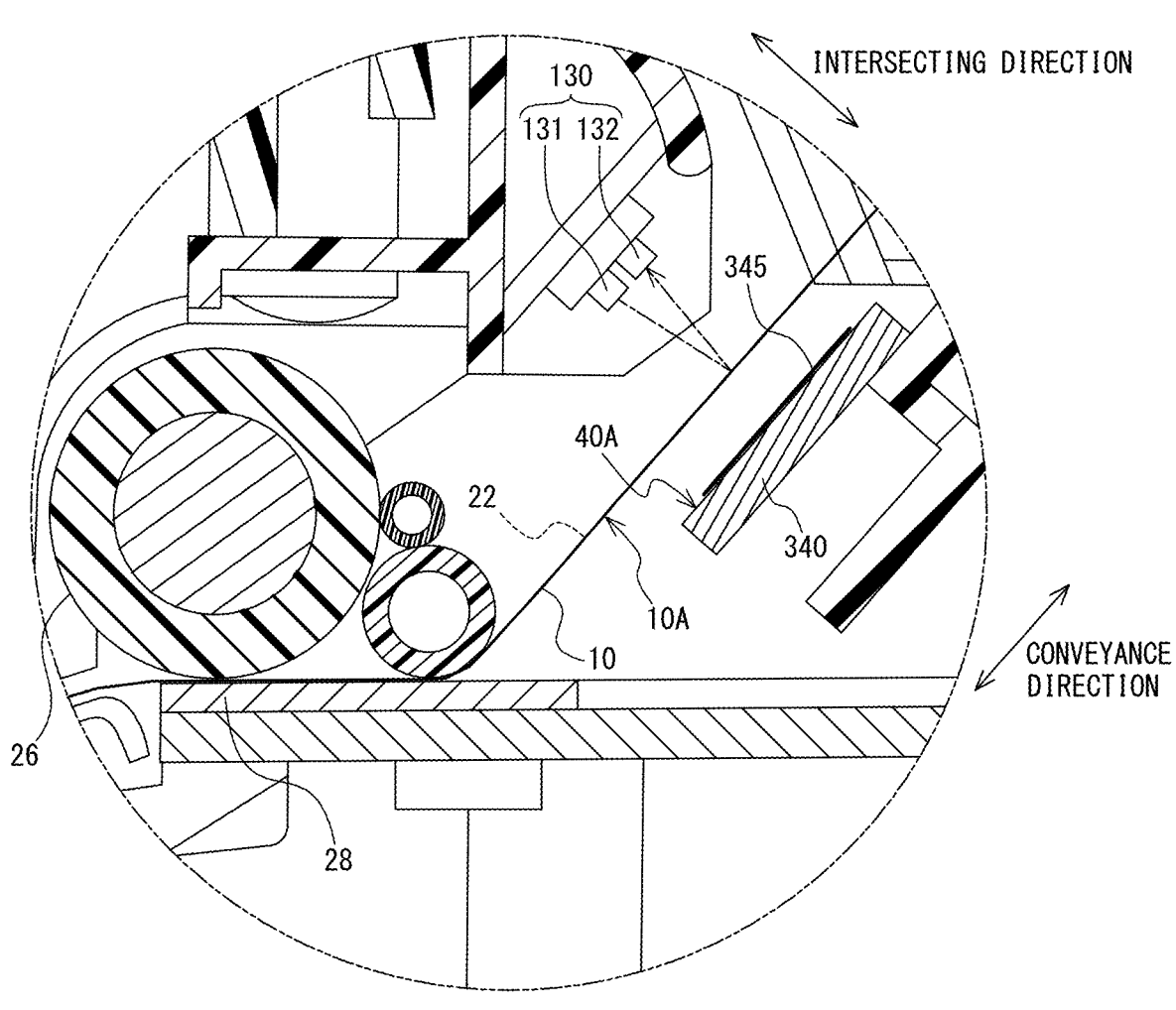
FIG. 9 is a cross-sectional view of the print device 1 in which the vicinity of positions at which an antenna substrate 340 and an optical sensor 130 are disposed is enlarged.
Figure 10:
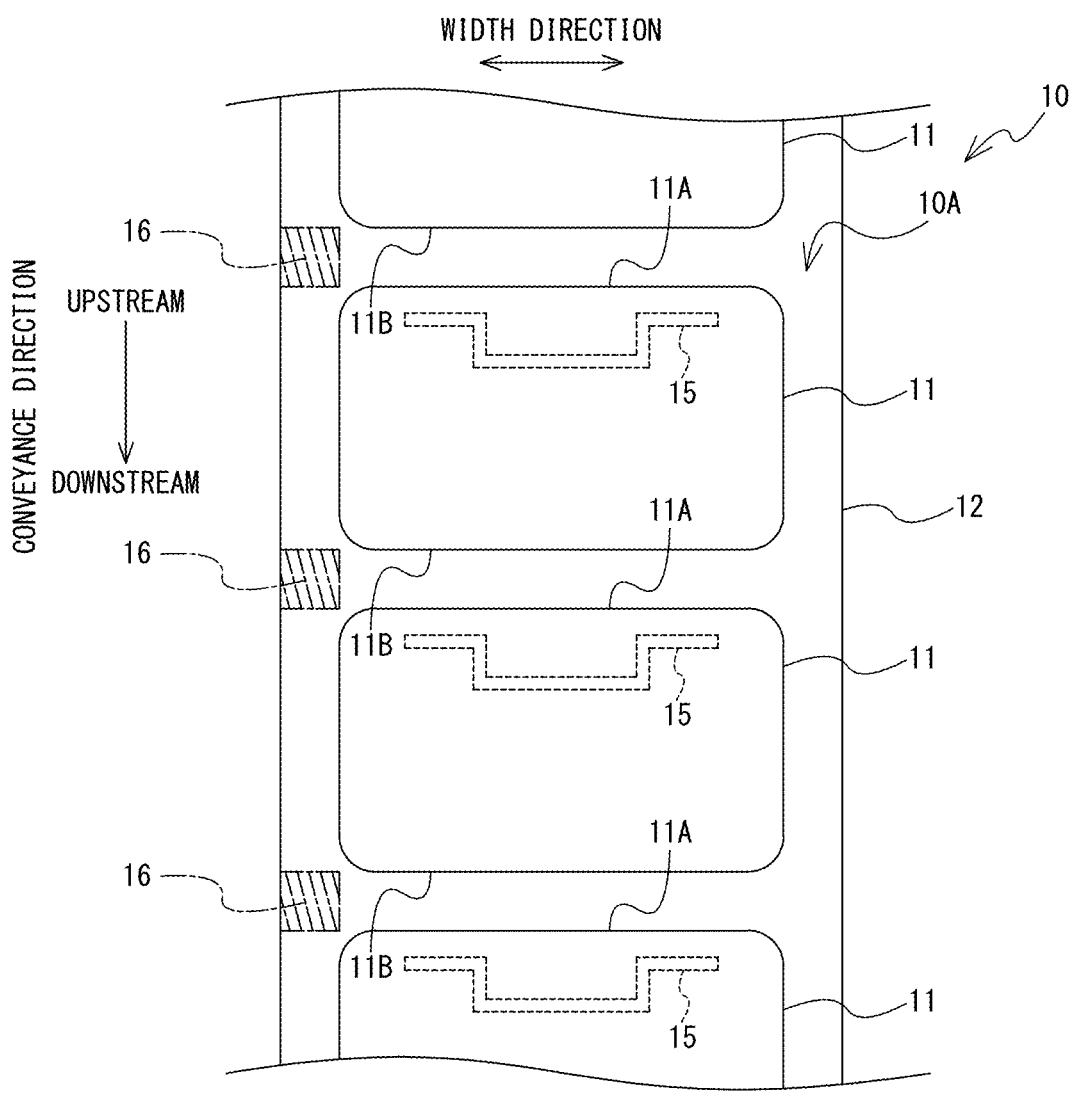
FIG. 10 is a plan view of the print tape 10 provided with detection marks 16 on the reverse side thereof.

The optical sensor 30 is the transmission type sensor, but a reflection type optical sensor 130 may be used, as illustrated in FIG. 9. The optical sensor 130 detects the positions of the end portions 11A and 11B of the label 11 as a result of detection light emitted from a light projecting portion 131 being reflected by the print tape 10 conveyed along the conveyance path 22 and the reflected light being received by a light receiving portion 132. As long as the label 11 and the backing sheet 12 have a color difference with a significantly different contrast, the optical sensor 130 may be provided on the side of the print surface 10A of the print tape 10, and may detect the positions of the end portions 11A and 11B of the label 11. When there is no color difference between the label 11 and the backing sheet 12, as illustrated in FIG. 10, the detection marks 16, which can be detected by the reflection type optical sensor 130, may be formed on the reverse surface of the print tape 10. A position of an end portion of the detection mark 16 on the upstream side in the conveyance direction, and a position of an end portion on the downstream side in the conveyance direction may be respectively aligned with the position of the end portion 11B on the downstream side of the label 11 in the conveyance direction and the position of the end portion 11A on the upstream side in the conveyance direction. In this way, the CPU 71 can identify the positions of the end portions 11A and 11B of the label 11, at positions at which the strength of the reflected light detected by the reflection type optical sensor 130 changes significantly. As illustrated in FIG. 9, in a similar manner to the above-described embodiment, the arrangement position of the optical sensor 130 in the conveyance direction is preferably disposed at a position of a formation range in the conveyance direction of an antenna 345 formed in the first surface 40A of an antenna substrate 340, or at a position in the vicinity thereof. Note that when the reflection type optical sensor 130 is used, a through hole need not necessarily be formed in the antenna substrate 340. The detection marks 16 normally have a high degree of contrast with the backing sheet 12. Thus, the optical sensor 130 can reduce erroneous detection of the position of the label 11, by identifying the positions of the end portions 11A and 11B of the label 11 using the detection marks 16. Further, since it is sufficient to dispose the optical sensor 130 on one side of the conveyance path 22, costs incurred in the production of the print device 1 can be reduced.

Figure 11:
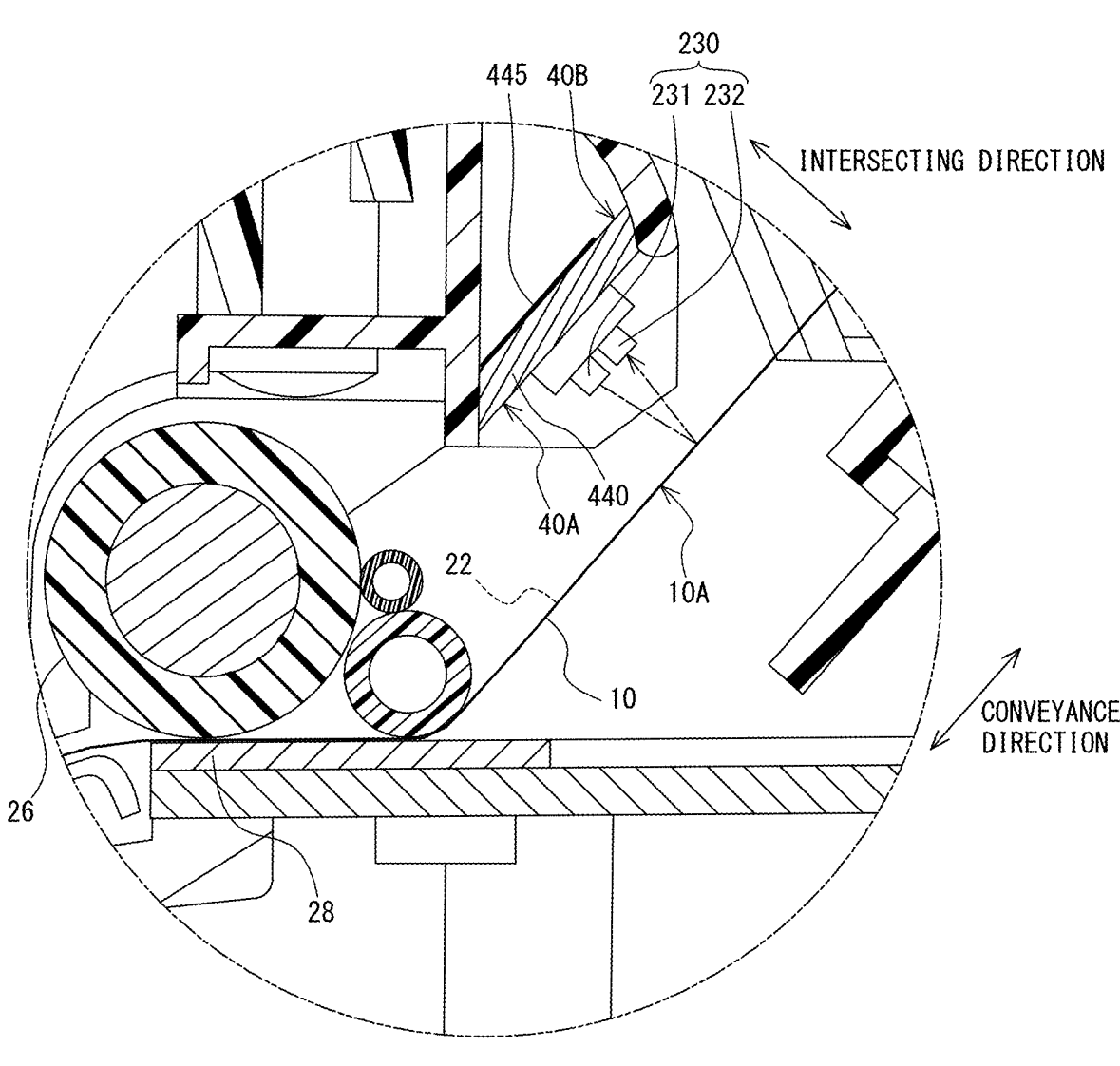
FIG. 11 is a cross-sectional view of the print device 1 in which the vicinity of positions at which an antenna substrate 440 and an optical sensor 230 are disposed is enlarged.

As illustrated in FIG. 11, an optical sensor 230 may be provided on the first surface 40A, of an antenna substrate 440, that faces the side of the conveyance path 22, and an antenna 445 may be provided on a second surface 40B on the opposite side to the first surface 40A. In this case also, the optical sensor 230 may be the reflection type optical sensor including a light projecting portion 231 and a light receiving portion 232. The CPU 71 can identify the positions of the end portions 11A and 11B of the label 11 as a result of the optical sensor 230 detecting the detection marks 16 (refer to FIG. 10) provided on the reverse surface on the opposite side to the print surface 10A of the print tape 10. In a similar manner to the above-described embodiment, the arrangement position of the optical sensor 230 in the conveyance direction is preferably disposed at a position of a formation range, in the conveyance direction, of the antenna 445 formed in the second surface 40B of the antenna substrate 440, or at a position in the vicinity thereof. In this way, since it is sufficient that the optical sensor 230 be disposed, in the first surface 40A of the antenna substrate 440, in the formation range in the conveyance direction of the antenna 445 formed in the second surface 40B, in the design of the antenna substrate 440, the arrangement position of the optical sensor 230 is easily set.

The print device 1 can perform the printing on the label 11, and can perform the wireless communication with the wireless tag 15, but may be a device simply capable of performing the wireless communication with the wireless tag 15, without performing the printing on the label 11. Alternatively, a device capable of performing the wireless communication with the wireless tag 15 may be attached to the print device 1 as an option, for example.

In place of the optical sensor 30, an ultrasonic sensor may be used, for example. In this case also, it is sufficient that the position of the ultrasonic sensor is within the formation range of the antenna 45 in the conveyance direction. Further, a switch or the like may be used that physically detects the position of the label 11 adhered to the backing sheet 12 by detection of a level difference. It is sufficient that the position of the switch is disposed within the formation range of the antenna 45 in the conveyance direction.

What is claimed is:
1. A wireless communication device comprising:
a conveyance portion configured to convey a backing sheet having a long shape along a conveyance path with a lengthwise direction of the backing sheet as a conveyance direction, the backing sheet on which a plu- rality of labels, each provided with a wireless tag, being adhered with intervals in the lengthwise direction of the backing sheet;

a sensor disposed facing the conveyance path in an intersecting direction and configured to detect an end portion of the label, the intersecting direction intersecting a width direction of the backing sheet conveyed by the conveyance portion and intersecting the conveyance direction;

a communication portion disposed facing the conveyance path in the intersecting direction, and provided with an antenna configured to perform wireless communication with the wireless tag;

a processor; and a memory storing computer-readable instructions that, when executed by the processor, instruct the processor to perform processes comprising:

detecting, using the sensor, an end portion on an upstream side of the label, while conveying the backing sheet in the conveyance direction using the conveyance portion, the label being on a downstream side, in the conveyance direction, of a target label and being adhered at a position adjacent to the target label, and the target label being, of the plurality of labels, a label that is a target of communication by the communication portion; and performing the wireless communication with the target label, using the communication portion, when the backing sheet is conveyed by a predetermined amount in the conveyance direction by the conveyance portion, wherein after the end portion on the upstream side in the conveyance direction of a chosen one of the labels, of the plurality of labels, is detected by the sensor, the predetermined amount is decided based on a communication state, between the communication portion and the wireless tag, detected at each of a plurality of positions when the backing sheet is sequentially conveyed to the plurality of positions in the conveyance direction using the conveyance portion, and when the sensor is seen in the intersecting direction, the sensor is disposed, with respect to the antenna, between a first end and a second end of the antenna in the conveyance direction.

2. The wireless communication device according to claim 1, wherein the sensor includes a light projecting portion configured to emit detection light toward the conveyance path, and a light receiving portion configured to receive the detection light transmitted through the conveyance path, and the sensor is a transmission type sensor in which the light projecting portion and the light receiving portion are disposed on the intersecting direction with a conveyance path in between, the sensor detecting the end portion of the label based on a strength of the transmitted light transmitted through the backing sheet conveyed on the conveyance path.

3. The wireless communication device according to claim 1, wherein the sensor includes a light projecting portion configured to emit detection light toward the conveyance path, and a light receiving portion configured to receive the detection light reflected by the backing sheet conveyed on the conveyance path, the sensor is a reflection type sensor in which the light projecting portion and the light receiving portion are disposed on one side, in the intersecting direction, of the conveyance path, the sensor detecting the end portion of the label based on a strength of the reflected light being the detection light reflected by the backing sheet on which a plurality of detection marks are formed corresponding to positions of each of the end portions of the plurality of labels and are used to detect the end portions of the labels.

4. The wireless communication device according to claim 2, wherein when the communication portion is seen in the intersecting direction, an arrangement position of the sensor with respect to the communication portion is a position at which a radio wave strength in the antenna when the antenna outputs a signal is strongest, or is a position in a vicinity of the position at which the radio wave strength in the antenna when the antenna outputs the signal is strongest.

5. The wireless communication device according to claim 4, wherein the antenna is a loop antenna and a power supply wiring line supplying power to the loop antenna, formed as a wiring pattern at a flat surface, of the communication portion, extending in the conveyance direction and the width direction, and when the communication portion is seen in the intersecting direction, the arrangement position of the sensor with respect to the communication portion is a position at a center inside a loop of the loop antenna in the wiring pattern, or is a position in a vicinity of the position at the center inside the loop of the loop antenna in the wiring pattern.

6. The wireless communication device according to claim 4, wherein the antenna is a dipole antenna and a power supply wiring line supplying power to the dipole antenna, formed as a wiring pattern at a flat surface, of the communication portion, extending in the conveyance direction and the width direction, and when the communication portion is seen in the intersecting direction, the arrangement position of the sensor with respect to the communication portion is a position, at the flat surface, at which the sensor does not interfere with the wiring pattern, between a first end and a second end of the wiring pattern in the conveyance direction, or is a position in a vicinity of the position, at the flat surface, at which the sensor does not interfere with the wiring pattern, between the first end and the second end of the wiring pattern in the conveyance direction.

7. The wireless communication device according to claim 4, wherein the antenna is a monopole antenna and a power supply wiring line supplying power to the monopole antenna, formed as a wiring pattern at a flat surface, of the communication portion, extending in the conveyance direction and the width direction, and when the communication portion is seen in the intersecting direction, the arrangement position of the sensor with respect to the communication portion is a position, at the flat surface, at which the sensor does not interfere with the wiring pattern, between a first end and a second end of the wiring pattern in the conveyance direction, or is a position in a vicinity of the position, at the flat surface, at which the sensor does not interfere with the wiring pattern, between the first end and the second end of the wiring pattern in the conveyance direction.

8. The wireless communication device according to claim 4, wherein the communication portion includes a through hole penetrating in the intersecting direction, at the arrangement position of the sensor when the communication portion is seen in the intersecting direction, and the detection light emitted from the light projecting portion is transmitted through the through hole and received by the light receiving portion.

9. The wireless communication device according to claim 4, wherein the communication portion includes a first flat surface extending in the conveyance direction and the width direction of the communication portion, and oriented toward the conveyance path, and a second flat surface extending in the conveyance direction and the width direction of the communication portion, and formed on an opposite side to the first flat surface, the sensor is disposed between the first flat surface and the conveyance path, and the antenna is formed at the second flat surface.

* * * * *